United States Patent [19]
Barbe

[11] Patent Number: 5,284,506
[45] Date of Patent: Feb. 8, 1994

[54] FAST RESPONSE HIGH PURITY MEMBRANE NITROGEN GENERATOR

[75] Inventor: Christian Barbe, Fontenay aux Roses, France

[73] Assignee: l'Air Liquide, Societe Anonyme pour l'Etude et l'Exploitation des Procedes Georges Claude, Paris, France

[21] Appl. No.: 935,296

[22] Filed: Aug. 26, 1992

[51] Int. Cl.$^5$ .............................................. B01D 53/22
[52] U.S. Cl. ........................................ 95/23; 95/54; 96/14; 55/210
[58] Field of Search ............................ 55/16, 68, 158

[56] References Cited

U.S. PATENT DOCUMENTS

| | | | |
|---|---|---|---|
| 3,735,558 | 5/1973 | Skarstrom et al. | 55/158 X |
| 4,556,180 | 12/1985 | Manatt | 55/158 X |
| 4,806,132 | 2/1989 | Campbell | 55/16 |
| 4,818,254 | 4/1989 | Anand et al. | 55/16 |
| 4,838,904 | 6/1989 | Sanders, Jr. et al. | 55/158 |
| 4,840,646 | 6/1989 | Anand et al. | 55/16 |
| 4,851,014 | 7/1989 | Jeanes | 55/16 |
| 4,874,401 | 10/1989 | Jeanes | 55/16 |
| 4,931,070 | 6/1990 | Prasad | 55/158 X |
| 4,944,776 | 7/1990 | Keyser et al. | 55/16 |
| 5,030,251 | 7/1991 | Rice et al. | 55/16 |
| 5,118,327 | 6/1992 | Nelson et al. | 55/16 |
| 5,125,937 | 6/1992 | Sadkowski et al. | 55/158 |
| 5,131,929 | 7/1992 | Brockmann et al. | 55/16 |

Primary Examiner—Robert Spitzer
Attorney, Agent, or Firm—Oblon, Spivak, McClelland, Maier & Neustadt

[57] ABSTRACT

A process for generating a nitrogen-enriched gas from a feed stream of atmospheric air or a mixture of nitrogen which is not continuously supplied to a membrane system, which membrane system comprises a non-permeate side and a permeate side, and being more permeable to oxygen than nitrogen, which process entails feeding the feed stream side of the membrane, and recovering an oxygen enriched gas being recovered on the permeate side of the membrane system while a nitrogen-enriched gas is recovered from the non-permeate side of the membrane, wherein a feed back of nitrogen gas or nitrogen- containing gas having an oxygen gas concentration lower than 21% is supplied to the non-permeate side of the membrane system during at least a part of the period of time where the air feed stream is not supplied to the membrane system thereby avoiding any substantial retrodiffusion of oxygen through the membrane system from the permeate side to the non-permeate side of the membrane during those periods of time where the feed stream is not supplied to the membrane system.

19 Claims, 1 Drawing Sheet

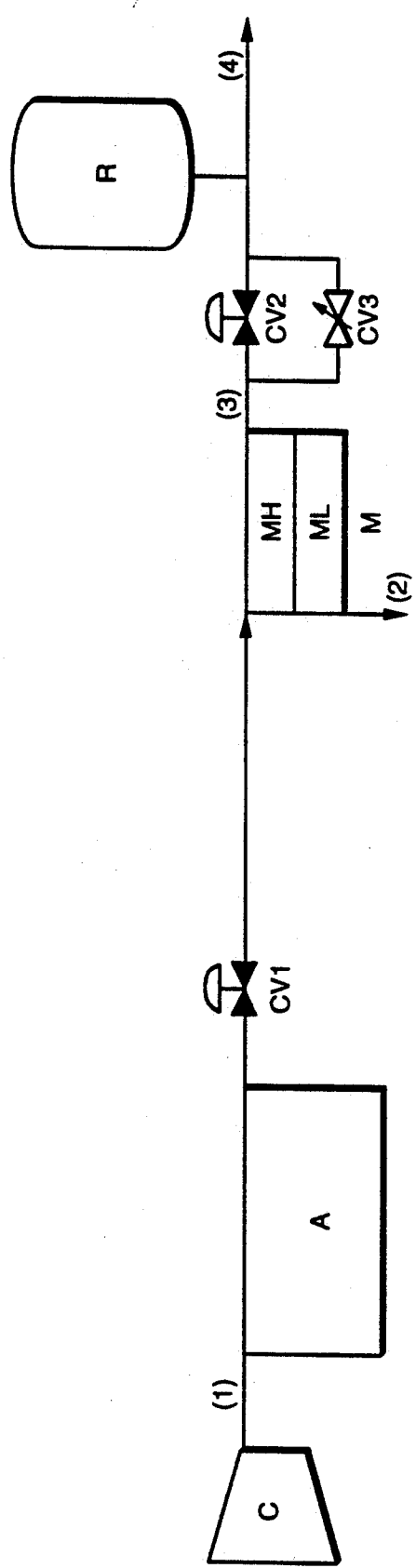
FIG._1
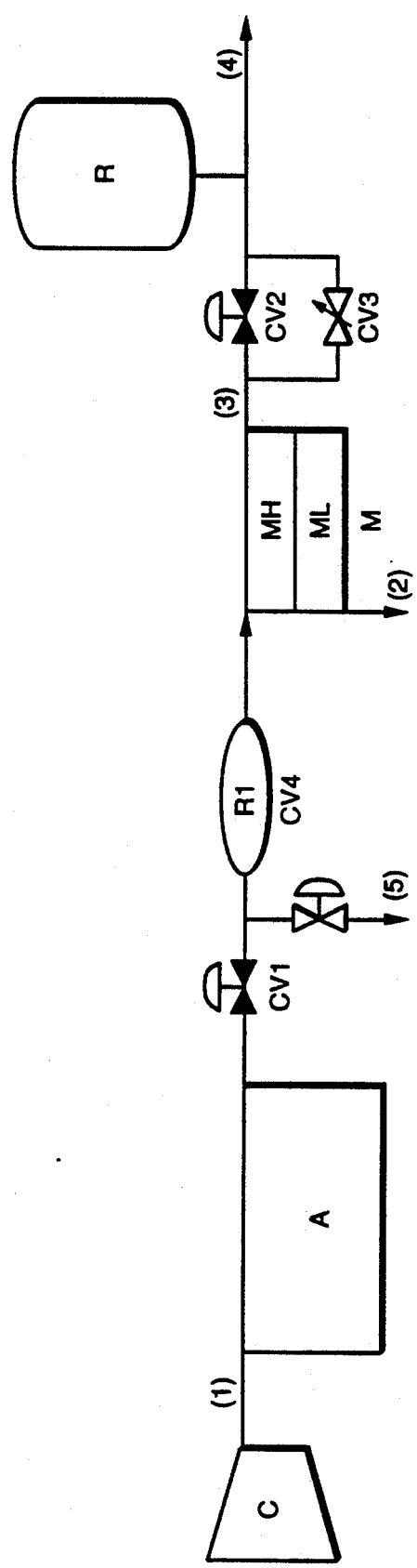
FIG._2

FAST RESPONSE HIGH PURITY MEMBRANE NITROGEN GENERATOR

BACKGROUND OF THE INVENTION

1. Field of the Invention

The present invention relates to a fast response high purity membrane nitrogen generator.

2. Description of the Background

Membrane processes are used increasingly to remove a desired single gas from a gaseous feed mixture. For example, such processes may be used to remove water vapor from a moist air feed to produce a dry air product. As water vapor is more rapidly permeated through the membranes than other gases, the non-permeate product has a lower concentration of water vapor than does the feed.

Membrane processes may also be used to produce inert gases from air, wherein the oxygen content in the feed air stream to the membrane is decreased by permeation from a high pressure side to a low pressure side. Generally, such membrane processes are advantageous due to their simplicity and ease of operation.

However, membrane processes used for the production of inert gases from atmospheric air are disadvantageous as they are generally non-responsive to variation in customer demand. For example, membrane nitrogen generators are presently used to feed customer lines where demand may diminish to zero several times per day.

When demand reaches zero and the feed air compressor stops, remaining high pressure feed air continues to flow across the membrane wall until pressures equalize. If the unit remains stopped for a considerable period of time, impurities in ambient air will eventually permeate back to the high pressure side of the membrane. When the unit is restarted in response to customer demand, back-permeated gas containing impurities will be first compressed by incoming feed air and then fed to the production line.

At present, production gas is vented to the atmosphere when the unit is restarted in order to avoid feeding polluted gas to the customer line. The venting either continues during a preset time delay so that production quality can be recovered or until the quality control meter indicates that the gas quality is sufficiently good. However, venting can lead to waste of costly gas and energy, particularly when low oxygen content and/or low dew point inert gas is produced.

Recently, a process was disclosed in EP 0,426,642 A2 for using a membrane gas separator in generally separating a portion of a first gas from an intermittently supplied gaseous feed containing a mixture of gases. In accordance with this process, the gaseous feed is fed intermittently under pressure through a membrane gas separator through one or more membranes through which the first gas permeates preferentially in comparison to other gases in the mixture to produce a non-permeate gas product which is discharged from a non-permeate gas side of the separator, wherein the concentration of the first gas is lower than in the feed mixture. Then, a gaseous purge stream is supplied to the separator when the feed mixture is not being conducted through the separator, with the concentration of the first gas being lower in the gaseous purge stream than in the feed mixture, whereby residual amounts of the first gas contained in the membrane of the separator are purged.

Notably, however, EP 0,426,642 A2 relates only to gas production in general or to the specific production of dehydrated air, and does not pertain to the specific production of nitrogen from atmospheric air or to the specific separation of nitrogen from oxygen.

Unfortunately, the variation in customer demand is particularly troublesome for the production of nitrogen. For example, if a "significant" period of generator use is considered, defined as the combined cycle duration of one period of production plus one period of generator down-time, generally the generator down-time may represent from about 1% to 50% of the overall total cycle.

However, in order for a backflush across the membrane to be acceptable to the customer on a cost basis as a means of preventing retrodiffusion of permeate gas across the membrane, the backflush must be a negligible volume of the gas produced by the generator, which means less than 10% of the overall volume of gas produced, and preferably less than 1%.

Further, while EP 0,426,642 A2 describes supplying a purge stream to the separator at times when the feed is not being supplied to the separator, the purpose of this purge stream is to remove residual water vapor to prevent it from being entrained in the non-permeate product when the gaseous feed is restarted, in order to improve removal efficiency.

Moreover, this purge stream is supplied to both sides of the separator with no distinction being made between permeate and non-permeate sides of the membrane.

Additionally, EP 0,426,642 A2 describes the use of either a primary pressure vessel alone or that in combination with a secondary pressure vessel. Generally, the primary pressure vessel is connected directly downstream of the non-permeate line via a check valve, whereas the secondary pressure vessel is connected to the non-permeate line on a side stream conduit via a flow orifice. Regardless of whether one or two pressure vessels are used, however, the function of the check valve is to allow relatively dry stored non-permeate product to bleed there through to the separator to purge residual amounts of water vapor contained in the membrane. Thus, when the compressor is cycled back on, the residual water vapor will not be entrained in the non-permeate product.

Additionally, EP 0,426,642 A2 neither describes nor suggests means for specifically feeding product gas to a high pressure side of a membrane in order to maintain a positive pressure on the feed inside thereof, particularly with a negligible loss of product gas, thereby avoiding back permeation or retrodiffusion of gas to the feed side of the membrane.

Thus, at present, gas generators in use are either for the production of gas, in general, or for dehydrated air, in particular, and are not generally constructed to address the specific problem of variation in customer demand in the production of nitrogen. Moreover, conventional gas generators often lose significant amounts of product gas by venting the same upon being restarted. Furthermore, such generators are generally incapable of being quickly restarted.

Therefore, a need exists for a membrane nitrogen generator which is capable of being instantly restarted after being down without venting of initial production, or without initial reduction of production volume.

SUMMARY OF THE INVENTION

Accordingly, it is an object of the present invention to provide a membrane nitrogen generator which is capable of being restarted instantly after being down without venting of initial production, or without initial reduction of production volume.

It is also an object of the present invention to provide a membrane nitrogen generator which is capable of preventing any substantial retrodiffusion of oxygen through the membrane system from the permeate side to the non-permeate side of the membrane when the generator is not in use.

It is further an object of the present invention to provide a process for producing a nitrogen-enriched gas from a feed stream of atmospheric air or a mixture of nitrogen and oxygen using a membrane nitrogen generator, wherein the feed stream is not continuously supplied to the membrane system.

Accordingly, the above object and others which will become apparent in view of the following disclosure are provided by a process for generating a nitrogen-enriched gas from a feed stream of atmospheric air or a mixture of nitrogen and oxygen, which is not continuously supplied to a membrane system, which membrane system entails a non-permeate side and a permeate side, and being more permeable to oxygen than nitrogen, which process entails feeding the feed stream to the non-permeate side of the membrane, and recovering an oxygen-enriched gas on the permeate side of the membrane system and a nitrogen-enriched gas from the non-permeate side of the membrane, wherein a feed back of nitrogen gas or nitrogen-containing gas having an oxygen gas concentration lower than 21% by volume is supplied to the non-permeate side of the membrane system during at least a part of the period of time where the feed stream is not supplied to the membrane system, thereby avoiding any substantial retrodiffusion of oxygen through the membrane system from the permeate side to the non-permeate side of the membrane during those periods of time when the feed stream is not supplied to the membrane system.

BRIEF DESCRIPTION OF THE DRAWINGS

FIG. 1 illustrates an embodiment of the present invention using a single receiver or product buffer tank.

FIG. 2 illustrates a second embodiment of the present invention also using an auxiliary receiver or product buffer tank.

DETAILED DESCRIPTION OF THE PREFERRED EMBODIMENTS

In accordance with the present invention, a fast response membrane nitrogen generator is provided which is capable of meeting customer demand as needed. In particular, the present membrane nitrogen generator is fitted with at least one product receiver or buffer tank on the production line. When customer demand diminishes to zero, the generator may continue to run until the pressure in at least one receiver reaches a maximum preset value (PSH). The unit is restarted when the pressure in the receiver falls under a minimum preset value (PSL). When pressure reaches the PSH value, a production valve or check-valve will close on the production line to avoid back feeding valuable product to the membrane with loss to the atmosphere.

Quite surprisingly, in accordance with the present invention, it has been discovered that if a small aperture control valve is installed in parallel with a production valve or check valve, and if the opening is set to a very low value, it is possible to feed back product gas to the high pressure side of the membrane and to maintain a positive pressure on the feed side of the membrane with a negligible loss of product gas. This positive pressure on the feed side makes it possible to avoid any back permeation or retro-diffusion of ambient air to the feed side of the membrane.

In accordance with the present invention, it has also been surprisingly discovered that a very small product backflow is sufficient to obtain the desired result described above. This appears to be due to the fact that the membrane used in the present process has a relatively high permeation flow for oxygen and a relatively low permeation flow for nitrogen, so that nitrogen product flow through the membrane is relatively low for a given positive pressure on the feed side.

In general, the present invention typically uses maximum preset valves (PSH) in the range of about 3 to 50 bar, preferably in the range of about 6 to 14 bar. Typically, minimum present valves (PSL) are used in the range of 1 to 49 bar, preferably in the range of 5 to 13.5 bar.

Further, the term "small aperture control valve" used in accordance with the present invention generally means a control valve which is properly sized to accurately control a flow equal to less than 10% of the nominal production flowrate of the generator, and preferably less than about 1%. With these guidelines, it is within the ability of one of ordinary skill in the art to select an appropriate value.

Generally, the present invention entails the use of one or more receivers or product buffer tanks which are used to store product nitrogen during production. During off periods, product nitrogen gas is released from at least one receiver or product buffer tank to flow across the non-permeate side of the membrane to maintain a sufficient pressure on the non-permeate side of the membrane to effectively prevent substantial retrodiffusion of oxygen across the membrane from the permeate side of the membrane.

Thus, by using the present invention, the amount of retrodiffused oxygen is far less than would otherwise be the case. In fact, no volume of product nitrogen need now be vented to the atmosphere due to oxygen contamination after the unit is restarted.

Generally, oxygen retrodiffusion from the low pressure side of the membrane, i.e. permeate side, to the high pressure side, i.e. non-permeate side, is the result of an oxygen partial pressure difference. Backflush of inert gas to the non-permeate side of the membrane does not, as such, prevent retrodiffusion of oxygen, what it does accomplish is clean the membrane to put it in a better position for restart.

When the unit stops, without using the present invention, the non-permeate side of the membrane still contains some atmospheric air at the inlet, and the permeate side contains oxygen-enriched, humid air. Moreover, some outside air may flow back into the permeate side through the effect of temperature variation, for example. As a result, some retrodiffussion of oxygen and water vapor will eventually take place so that high oxygen content product will be stored in the non-permeate side.

By contrast, when the unit stops, while practicing the present invention, air in the non-permeate side will be replaced by low pressure pure product and the permeate side will, therefore, be flushed by dry gas having a reduced oxygen content until an equilibrium of concentration and pressure are reached. At this time, no further deterioration of permeator atmosphere can occur except through occasional outside air reentry into the permeate side. This will be prevented, however, by permanent or semi-permanent backflush of stored pure product into the non-permeate side.

As noted above, a feed back of nitrogen or nitrogen-containing gas having an oxygen gas concentration lower than 21% by volume is obtained from at least one receiver or product buffer tank. However, if a nitrogen-containing gas is used, it is generally preferred that the gas have an oxygen gas concentration lower than about 10% by volume. It is particularly preferred if the nitrogen-containing gas have an oxygen gas concentration lower than about 5% by volume.

Generally, the membrane nitrogen generator of the present invention contains compressing means for a feed stream; a first flow control means in fluid connection with and downstream of the compressing means, and upstream of a membrane having a permeate side and a non-permeate side, the membrane being in fluid connection with the first flow control means; second and third flow control means in fluid connection with and downstream of the membrane; and at least one receiver or product buffer tank on-line and downstream of the second and third flow control means.

Preferably, the membrane nitrogen generator further contains air conditioning means in fluid connection with and downstream of the compressing means, and in fluid connection with and upstream of the first flow control means.

The present membrane nitrogen generator may also have an auxiliary receiver or product buffer tank in fluid connection with and downstream of the first flow control means, and in fluid connection with and upstream of the membrane.

In accordance with the present invention, conventional compressing means, such as a standard compressor, and air conditioning means may be used.

In accordance with the present invention, it has been surprisingly discovered that only a very small product backflow is sufficient to obtain the desired result.

For example, in one space, the present invention may be practiced by using a constant bleeding of stored product through valve CV3. This flow can, for example, be equal to about 1/1,000 to 1/10,000 of nominal production, provided that such flow is evenly distributed among the different membrane modules in the unit.

In another aspect, the present invention may be practiced by using occasional bursts of bleed gas, e.g. at regular intervals.

In fact, bleed flow may be about 10% of nominal production, which makes it quite easy to distribute the same evenly among membrane modules. Each bleed gas injection may have a duration of from about 20 seconds to 1 minute, and the frequency of the injections may range from one per hour to one per 5 hours. Therefore, the average bleed flow will range from 1/1,000 to 1/10,000 of nominal production flow.

In essence, and in general, the typical range for product back-flow may be 1/10 to 1/100,000 of nominal flow on a daily average basis, preferably, however, the range is from about 1/1,000 to about 1/10,000 of nominal flow.

FIGS. 1 and 2 will now be described in more detail.

In FIG. 1, feed stream is passed from compression means (c) via conduit (1) to air conditioning means (A) for removal of oil, and dust and to control the temperature of the feed stream. Downstream of air conditioning means (A) is a first check valve (CV1) through which the conditioned feed stream is fed to the feed side or high pressure side of a membrane (MH). Permeate passes through the membrane (M) via the permeate side (ML) and to the atmosphere via conduit (2).

The non-permeate passes via conduit (3), i.e., the product line, to a second check valve (CV2) for storage of excess production in receiver R. When pressure in receiver R reaches maximum PSH value, compressor C and valves CV1 and CV2 close automatically, The pressure in line 3 and in ML compartment of the membrane will decrease regularly. When pressure in receiver R becomes larger than the pressure in line 3, product will flow from receiver R to line 3 via a third check valve (CV3). Conduit (4) is customer product line.

FIG. 2 illustrates another embodiment of the present invention, wherein R1 is an auxiliary buffer tank, CV4 is a fourth check valve, more particularly a small diameter solenoid valve and conduit (5) is a drain line to the atmosphere.

Having described the present invention, reference will now be made to certain examples which are provided for purposes of illustration and are not intended to be limitative.

EXAMPLE 1

In order to more easily appreciate this embodiment, reference is made to FIG. 1.

C=feed air compressor
M=membrane
MH=feed side (high pressure side) of membrane
ML=permeate side (low pressure side) of membrane
  removal, and temperature control, for example)
R=receiver (product buffer tank)
1=compressed air feed line
2=permeate line (to atmosphere)
3=production line
4=product line (to customer)
CV1,CV2=valves (or check valves)
CV3=small diameter control valve In normal operation, valves CV1 and CV2 are open so that product is fed to product line and receiver. The control valve and system for product purity and flow control are not indicated in FIG. 1.

When pressure in receiver R reaches maximum PSH value, compressor C and valves CV1 and CV2 close automatically: pressure in line 3 and in MH compartment of the membrane will decrease regularly, when pressure in receiver R becomes larger than pressure in line 3, product will flow from receiver R to line 3 via valve CV3.

Valve CV3 is a manual small bore metering valve preset so as to insure a small backflow to compartment MH. All remaining air at inlet of MH will eventually permeate to ML so that line 3 will remain at all times protected from atmosphere.

Compartment ML itself will be flushed with product permeated through membrane.

When pressure in R falls below minimum PSL value, compressor C will start again, valves CV1 and CV2 will open. Product backflush in line 3 at low pressure will be repressurized by feed air so that first product flowing through valve CV2 will have requested quality.

EXAMPLE 2

In order to more easily appreciate this embodiment, reference is made to FIG. 2.

Captions read same as for sketch 1 with addition of:
R1: auxiliary buffer tank
CV4: small diameter solenoid valve
5: drain line (to atmosphere)

When desired product purity is very high and when very fast response time is needed, it is then valuable to add auxiliary buffer tank R1 with bleed line 5.

When unit stops, due to PSH trip value for pressure in receiver R, valve CV4 is open for a few seconds so that pressure in line 3, MH and R1 is decreased to near atmospheric value. In this way all remaining air at inlet of line 3 is purged to atmosphere.

Clean product will then fill line 3, MH and R1 to given positive pressure.

On restart, clean product stored in receiver R1 will be recompressed in zones MH and 3, so that when fresh feed air will reach zone MH, all operating parameters, and mainly permeation pressure in MH will already be close to nominal. In this way, product purity will at all times be equal to or better than specification, even in case of a very fast restart.

Generally, in accordance with the present invention, any conventional membrane may be used for producing nitrogen from atmospheric air or from mixtures of nitrogen and oxygen. For example, one or more membranes, such as polyimide, polycarbonate, nylon-6,6, polystyrene and cellulose acetate membranes may be used.

Further, the phrase "a relatively high permeation flow for oxygen and a relatively low permeate flow for nitrogen" is meant to refer to a membrane where the ratio of oxygen permeation to nitrogen permeation (selectivity) is in the range of 3 to 12, preferably 4 to 7.

In general, the buffer tank used in the present invention will be sized by customer use patterns. Typically, buffer tank volume will be equal to 10% to 30% of nominal hourly production of the generator, i.e. a 100 $Nm^3/$ generator will usually be fitted with a 10 to 30 $m^3$ receiver.

As noted above, the present invention advantageously prevents substantial retrodiffusion of oxygen across the membrane or membranes. Generally, by preventing "substantial retrodiffusion of oxygen" is meant that the amount of oxygen which does retrodiffuse through the membrane will result in an oxygen content in the non-permeate side which is not increased while the unit is stopped by more than 1% of nominal oxygen content in the product as accepted by the customer.

FIGS. 1 and 2 and the elements thereof will now be described in more detail.

Element C may be any compressing means, such as an air compressor of any type, for example, of the lubricated screw, non-lubricated screw, reciprocating or centrifuge type.

Element A may consist of a water droplet separator, rough and fine coalescing filters for oil mist removal, activated carbon tower for oil vapor removal, electric or otherwise heater for bringing air to operating temperature. In some cases, a refrigerating dryer can be used to improve the efficiency of oil removal through partial drying of air.

Further, CV1 and CV2 may be any type of valve, such as pneumatic or solenoid valve. It may be a standard valve, a control valve or a check valve. CV3 may be any of the above types, and may, moreover, also be a combination of a solenoid valve or the equivalent thereof in series with an orifice sized to restrict flow to the required value.

Additionally, R is any type of pressure vessel which is fit for product gas storage under pressure.

Those skilled in the art will appreciate that various changes and modifications can be made in the details of the invention without departing from the scope of the invention as set forth in the appended claims. Thus, the permeable membranes employed in the practice of the invention will commonly be employed in membrane assemblies typically positioned within enclosures to form a membrane module comprising the principal element of a membrane system. As understood with reference to the invention, a membrane system comprises a membrane module of a number of such modules, arranged for either parallel or series operation. The membrane modules can be constructed in convenient hollow fiber form, or in spiral wound, pleated flat sheet membrane assemblies, or in any other desired configuration. Membrane modules are contracted to have a feed air surface side and an opposite permeate gas exit side. For hollow fiber membranes, the feed air can be added either to the bore side or to the other surface side of the hollow fibers.

It will also be appreciated that the membrane material employed for the air separation membrane can be any suitable material capable of selectively permeating a more readily permeable component of the feed gas, i.e. air or impure hydrogen. Cellulose derivatives, such as cellulose acetate, cellulose acetate butyrate and the like; polyamides and polyimides, including aryl polyamides and aryl polyimides; polysulfones; polystyrenes and the like, are representative of such materials. However, in accordance with the present invention, polyimides are preferred.

As indicated above, the permeable membranes comprising the membrane system positioned within the insulated enclosure of the invention may be in any desirable form, with hollow fiber membranes being generally preferred. It will be appreciated that the membrane material employed in any particular gas separation application can be any suitable material capable of selectively permeating a more readily permeable component of a gas of fluid mixture containing a less readily permeable component. Cellulose derivatives, such as cellulose acetate, cellulose acetate butyrate, and the like; polyamides and polyimides, including aryl polyamides and aryl polyimides; polysulfones; polystyrenes and the like, are representative examples of such materials. It will be understood in the art that numerous other permeable membrane materials are known in the art and suitable for use in a wide variety of separation operations. As noted, the membranes, as employed in the practice of the invention, may be in composite membrane for in asymmetric form or in any such form that is useful and effective for the particular gas separation being carried out using the system and process of the invention.

The hollow fiber membranes are generally formed from a polymeric material which is capable of separating one or more fluids from one or more other fluids in a fluid mixture. The polymeric materials which may be used to prepare the hollow fiber membranes preferably include olefinic polymers such as poly-4-methylpentene, polyethylene, and polypropylene; polytetrafluoroethylene; cellulosic esters, cellulose ethers, and regenerated cellulose; polyamides;polyetherketones and polyetheretherketones; polyestercarbonates and polycarbonates, including ring substituted versions of bisphenol based polyestercarbonates and polycarbonates; polystyrenes; polysulfones; polyimides; polyethersulfones; and the like. The hollow fiber membranes may be homogenous, symmetric (isotropic), asymmetric (anisotropic), or composite membranes. The membranes may have a dense discriminating region which separates one or more fluids from one or more other fluids based on differences in solubility and diffusivity of the fluids in the dense region of the membrane. Alternatively, the membranes may be microporous and separate one of more fluids from one or more other fluids based on relative volatilities of the fluids.

Hollow fiber membranes with dense regions are preferred for gas separation. Asymmetric hollow fiber membranes may have the discriminating region either on the outside of the hollow fiber, at the inside (lumen surface) of the hollow fiber, or located somewhere internal to both outside and inside hollow fiber membrane surfaces. In the embodiment wherein the discriminating region of the hollow fiber membrane is internal to both hollow fiber membrane surfaces, the inside (lumen) surface and the outside surface of the hollow fiber membrane are porous, yet the membrane demonstrates the ability to separate gases. In the embodiment wherein gases are separated, the preferred polymeric materials for membranes include polyestercarbonates, polysulfones, polyethersulfones, polyimides, and polycarbonates. More preferred polymeric materials for gas separation membranes include polycarbonates and polyestercarbonates. Preferred polycarbonate and polyestercarbonate membranes for gas separation include those described in U.S. Pat. Nos. 4,874,401; 4,851,014; 4,840,646 and 4,818,254; the relevant portions of each patent incorporated herein by reference for all legal purposes which may be served thereby. In one preferred embodiment, such membranes are prepared by the process described in U.S. Pat. No. 4,772,392, the relevant portions incorporated herein by reference for all legal purposes which may be served thereby.

Generally, the present invention provides a rapid generator start-up ranging from less than one minute down to only a few seconds in cases where air or feed is already available under pressure without having to start the compressor.

Having described the present invention, it will be apparent to the artisan that many changes and modifications may be made to the above-described embodiments without departing from the spirit and the scope of the present invention.

What is claimed as new and desired to be secured by letters patent of the U.S. is:

1. A process for generating a nitrogen-enriched gas from a feed stream of atmospheric air or a mixture of nitrogen and oxygen, which is not continuously supplied to a membrane system, which membrane system, comprises at least one membrane having a non-permeate side and a permeate side, and being more permeable to oxygen than nitrogen, which process comprises feeding the feed stream to the non-permeate side of said at least one membrane, and recovering an oxygen-enriched gas on the permeate side of the membrane system while a nitrogen-enriched gas is recovered from the non-permeate side of the membrane, wherein a feedback of nitrogen gas or nitrogen-containing gas having an oxygen gas concentration lower than 21% by volume is supplied by the non-permeate side of the membrane during at least a part of the period of time when the feed stream is not supplied to the membrane system, in an amount equal to at least about 1/100,000 of nominal production, with the flow thereof being substantially evenly distributed among the at least one membrane, thereby avoiding any substantial retrodiffusion of oxygen through the membrane system from the permeate side to the non-permeate side of the at least one membrane during those periods of time where the feed stream is not supplied to the membrane system.

2. The process of claim 1, wherein said feed back is a nitrogen-containing gas having an oxygen gas concentration lower than about 10% by volume.

3. The process of claim 2, wherein said nitrogen-containing gas has an oxygen gas concentration of lower than about 5% by volume.

4. The process of claim 1, wherein said feed back of nitrogen gas or nitrogen-containing gas is supplied to said non-permeate side of said membrane system via a check valve from a product buffer tank, when product buffer tank gas pressure is larger than gas pressure in a conduit downstream of said membrane, but upstream of said product buffer tank.

5. The process of claim 1, wherein said membrane is a polyimide membrane.

6. The process of claim 1, wherein said feedback of nitrogen gas or nitrogen-containing gas having an oxygen gas concentration lower than 21% by volume is supplied to the non-permeate side of the membrane in an amount of from at least about 1/1,000 to 1/10,000 of nominal production.

7. The process of claim 6, wherein said feedback of nitrogen gas or nitrogen-containing gas having an oxygen gas concentration lower than 21% by volume is supplied intermittently to the non-permeate side of the membrane at a bleed flow o about 10% of nominal production, with a bleed duration of from about 20 seconds to 1 minute, with a bleed frequency of from about 1 per hour to 1 per 5 hours.

8. The process of claim 1, wherein said membrane system comprises one or more membranes made of a material selected from the group consisting of polyamide, polycarbonate, nylon-6,6, polystyrene and cellulose acetate.

9. The process of claim 8, wherein said membrane system comprises one or more membranes made of polyamide.

10. A membrane nitrogen generator having a fast response to variable customer demand, which comprises:
 (a) feed stream compressing means,
 (b) first flow control means in fluid connection with and downstream of said compressing means, and upstream of at least one membrane having a permeate side and a non-permeate side, said at least one membrane being in fluid connection with said first flow control means, and
 (c) second and third flow control means in fluid connection with and downstream of said at least one membrane, thereby allowing a feedback of nitrogen gas or nitrogen-containing gas having an oxygen gas concentration lower than 21% by volume to be supplied to the non-permeate side of the at least one membrane during at least a part of the period of time when the feed stream is not supplied to the at least one membrane system, thereby avoiding any substantial retrodiffusion of oxygen through the membrane system from the permeate side to the non-permeate side of the at least one membrane during those periods of time when the feed stream is not supplied to the membrane system.

11. The membrane nitrogen generator of claim 10, which further comprises air conditioning means in fluid connection with and downstream of said compressing means, and in fluid connection with and upstream of said first flow control means.

12. The membrane nitrogen generator of claim 10, which further comprises an auxiliary receiver or product buffer tank in fluid connection with and downstream of said first flow control means, and in fluid connection with and upstream of said membrane.

13. The membrane nitrogen generator of claim 10, wherein said first, second and third flow control means are valves.

14. The membrane nitrogen generator of claim 10, wherein said first and second flow control means are open and said third flow control means is closed for normal operation of said generator, and said first and second flow control means are closed and said third flow control means is open in order to provide said feed back to said membrane system.

15. The membrane generator of claim 10, wherein said membrane is a polyimide membrane.

16. The membrane nitrogen generator of claim 10, wherein said at least one membrane is made of a material selected from the group consisting of polyamide, polycarbonate, nylon-6,6, polystyrene and cellulose acetate.

17. The membrane nitrogen generator of claim 16, wherein said membrane system comprises one or more membranes of polyamide.

18. The membrane nitrogen generator of claim 10, wherein said second and third flow control means comprise a small aperture control valve in parallel with a production valve or check valve, said small aperture control valve being one which is sized to control a flow equal to less than 10% of the nominal production flowrate.

19. The membrane nitrogen generator of claim 18, wherein said small aperture control valve is sized to control a flow equal to less than about 1% of nominal production flowrate.

* * * * *